March 8, 1927.
W. C. BRYE
COT FOR AUTOMOBILES
Filed Aug. 29, 1925
1,620,433
3 Sheets-Sheet 1
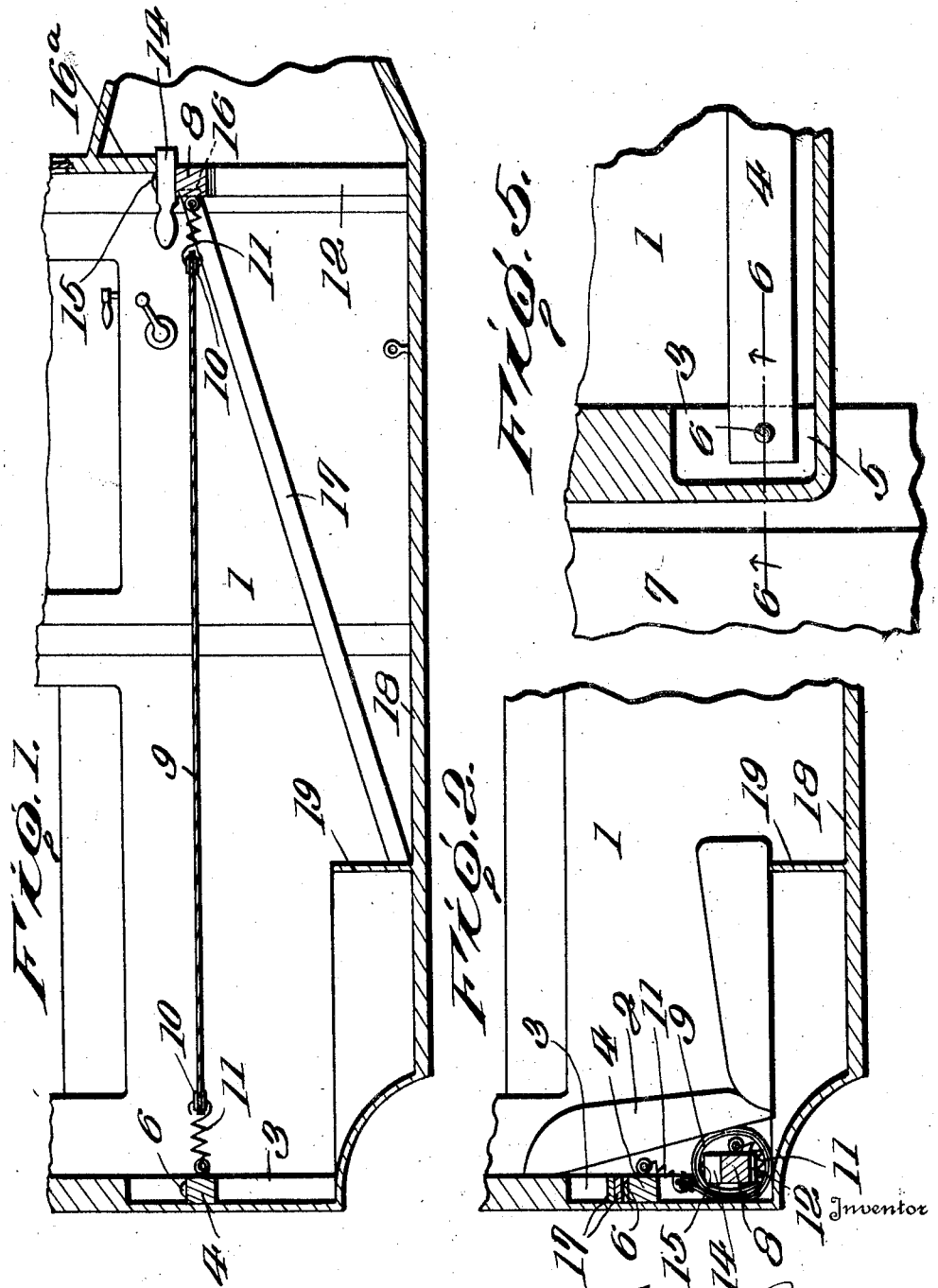

March 8, 1927.
W. C. BRYE
COT FOR AUTOMOBILES
Filed Aug. 29, 1925
1,620,433
3 Sheets-Sheet 2
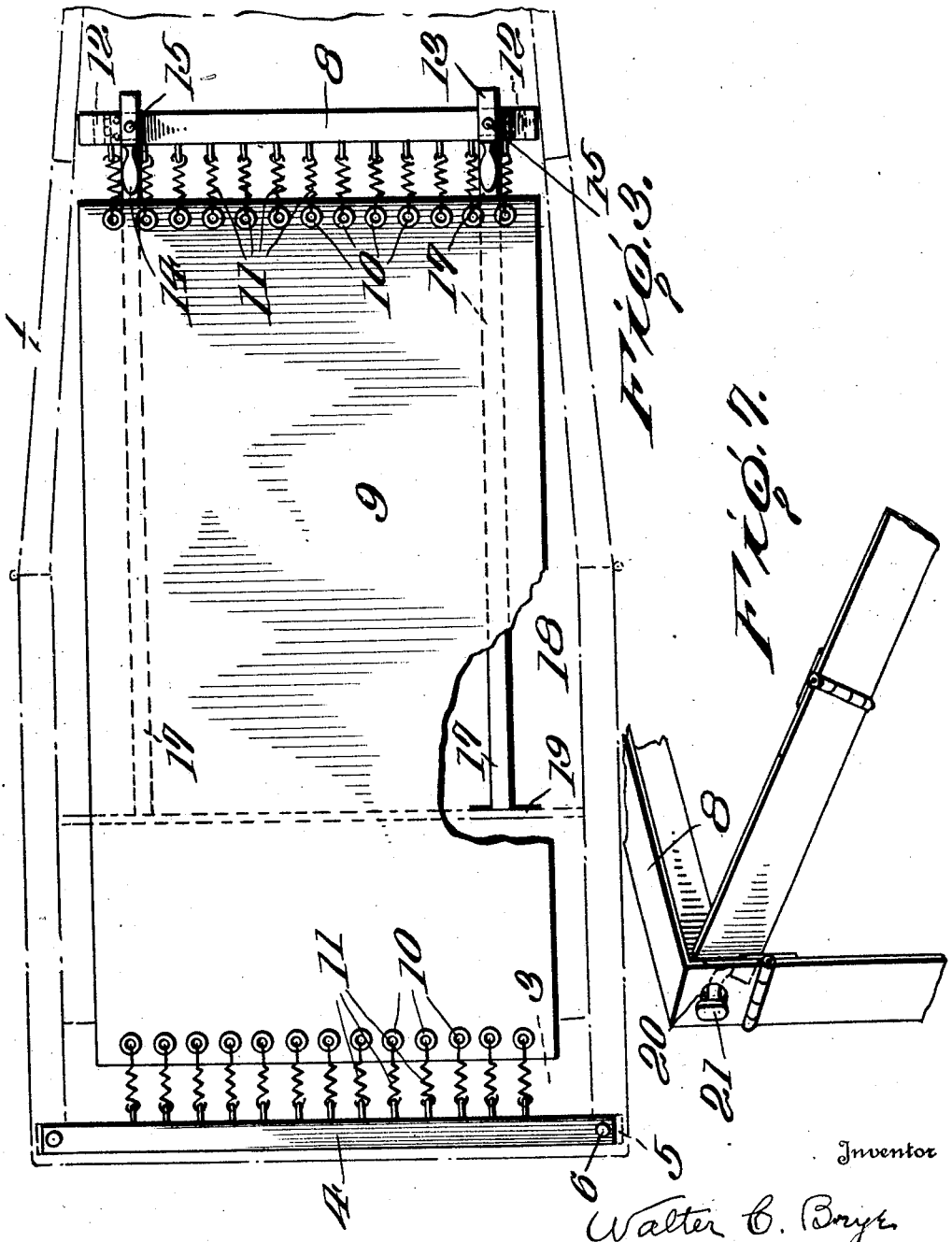

March 8, 1927.   W. C. BRYE   1,620,433
COT FOR AUTOMOBILES
Filed Aug. 29, 1925   3 Sheets-Sheet 3
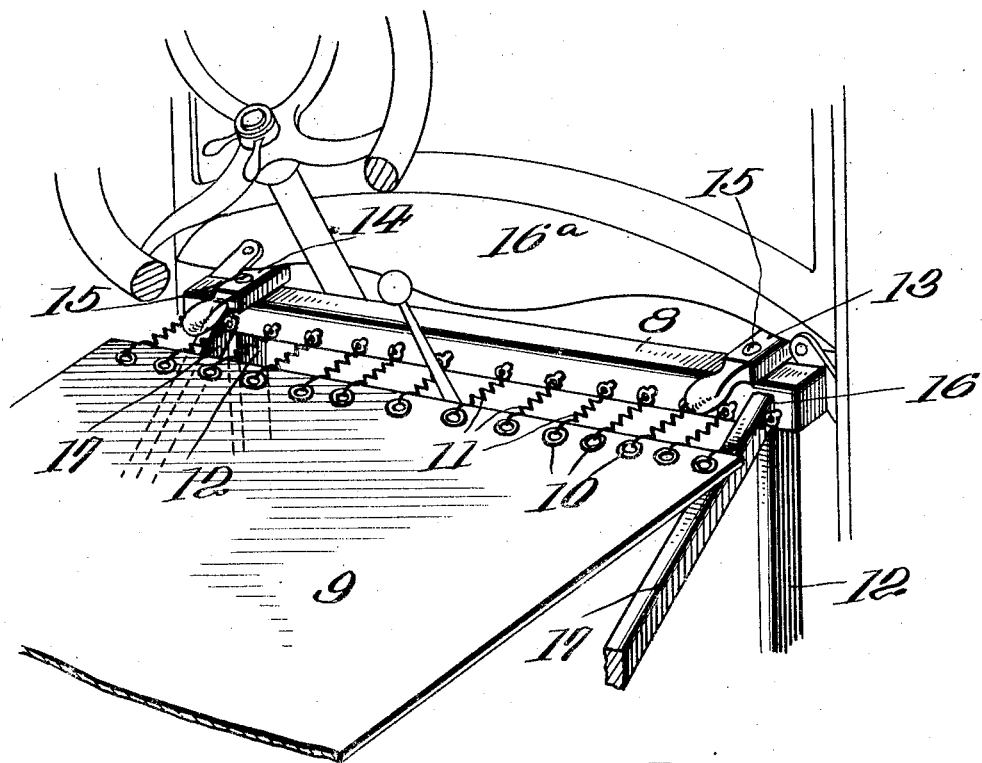
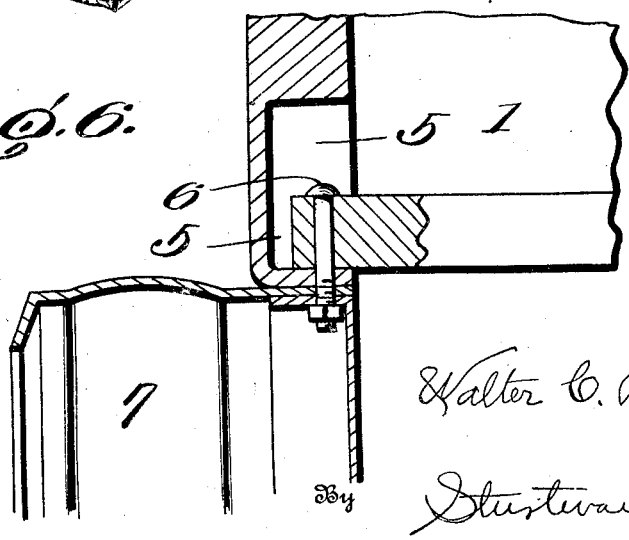

Patented Mar. 8, 1927.

1,620,433

UNITED STATES PATENT OFFICE.

WALTER C. BRYE, OF KNOXVILLE, TENNESSEE.

COT FOR AUTOMOBILES.

Application filed August 29, 1925. Serial No. 53,312.

My invention relates to improvements in cots for bodies of automobiles.

The object of my invention is to provide a cot for the body of an automobile which can be readily attached within the body of the automobile and extend from the rear wall thereof to the instrument board and from side to side so that a full size bed is formed in practically all of the standard size sedans or coaches.

Another object of my invention is to provide a cot of this character which is readily attached to the automobile and carried as a part thereof and when not in use is rolled and concealed behind the back cushion so that there is no attaching means visible within automobile when not in use.

Another object of my invention is to provide a cot of this character which can be readily placed in position for use and rigidly supported without injury to any part of the automobile and when opened for use cannot possibly collapse and at same time providing a simple, cheap and effective cot having certain details of structure and combination of parts hereinafter more fully set forth.

In the accompanying drawings:

Fig. 1 is a longitudinal vertical sectional view of a closed automobile showing my cot in position for sleeping.

Fig. 2 is a vertical sectional view showing the cot in collapsed position within the pocket behind the back cushion of the rear seat.

Fig. 3 is a top plan view of the cot in position showing it of practically the same size as the inside dimensions of the automobile.

Fig. 4 is a perspective view of the front end of the car showing the means of fastening the forward frame of the cot to the instrument board of the automobile.

Fig. 5 is a vertical sectional view showing the means for attaching the rear frame of the cot within the pocket behind the back cushion of the rear seat.

Fig. 6 is a longitudinal sectional view taken on the line 6—6 of Fig. 5.

Fig. 7 is a perspective view of one of the end frames showing a modified form of brace connection.

Referring now to the drawings, Fig. 1 represents the body of a closed auto and while I have shown my invention as applied to a closed body, it will be understood that the same can be as readily applied to a touring body. In the application of the invention as shown in the drawings the back cushion 2 of the rear seat is made removable and formed in the body of the auto in rear thereof is a pocket 3, which extends entirely across the automobile and of a height less than that of the back cushion 2, so that when said cushion is in position for use, the pocket and the collapsed cot are completely concealed.

The cot comprises a rear bar 4, which is of wood, metal or the like, and of a length slightly greater than the inside dimensions of the body, and has its ends extending into the recess 5 in the side walls of the body and is secured to the side walls by means of bolts 6 which are the bolts that fasten the fenders 7 to the body. While I have shown this specific means of attaching this bar 4 to the body, it will be understood that it may be attached by hooks or in any desired manner.

The cot also comprises a front bar 8, and the two bars are connected by the strip of canvas 9 of the size and shape shown in Fig. 3 of the drawings. The strip of canvas is preferably provided at each end with eyes 10 into which hook the springs 11, which have their opposite ends attached to the bars 4 and 8 and whereby a cot is formed having more nearly the characteristics of a wire woven cot.

Hinged to the lower face of the front bar 8 are two feet 12 which swing down and rest upon the floor board in front of the driver's seat, and whereby the front bar 8 is supported in a horizontal plane containing the rear bar 4. Pivotally carried by the upper face of the front bar 8 are the locks 13 and 14 which are adapted to be swung on their pivots 15 so that their outer ends will extend under the instrument board 16ª so that the said bar is prevented from riding upward when weight is applied to the canvas body.

In order to prevent the front bar 8 from moving rearwardly by the weight of the canvas body, it is provided adjacent each end with a recess 16 into which extends braces 17 which extend rearward and which engage the rear floor board 18 and the rear seat support 19. The braces are provided with suitable stops to limit their movement within the recesses 16. While I have shown this specific means of attaching the braces, it will be understood that the front bar 8 could be of the form shown in Fig. 7, having its ends provided with a round or keyhole slot 20 through which extends the headed laterally turned end 21 of the brace.

The invention is particularly adapted for use in connection with closed cars, as has heretofore been stated. When it is desired to use the cot, the back of the forward seat and the rear cushion of the back seat are removed and may be stored in any suitable place, as under the car. Instead of removing the back of the forward seat, it may, of course, be arranged so as to fold. After the seats have been properly arranged, then the cot may be stretched forward and attached to its front supporting means, and thus the cot is formed of practically the same size as the interior of the body of the car.

While I have shown and described my preferred specific form of construction, I do not desire to be limited to the details thereof, as it is believed that the invention in its broadest aspects is directed to a cot having one end permanently attached to the body and the opposite end constructed so that it may be rigidly supported without bolts, screws or bracket attachments to the body. By this construction there is no visible attaching means when the cot is rolled and stored in the pocket behind the back of the rear seat.

What is claimed as new is:—

1. A cot for automobiles comprising front and rear end frames connected by flexible strips, means for supporting the rear frame, legs carried by the front frame and resting on the floor board of the automobile, and projections carried by said front frame and extending under the lower edge of the instrument board and freely contacting therewith to hold the cot against upward movement.

2. The combination with an automobile, of a pocket in the body thereof behind the removable back of the rear seat, a frame secured in said pocket, a flexible strip secured to the frame, a frame carried by the opposite end of the strip, folding legs carried by the frame and resting on the floor board, pivoted locks carried by the frame and extending under the instrument board, braces removably connected to the frame and engaging the floor boards and the support of the rear seat, and said frame braces, legs and locks adapted to be rolled in the strip and placed in the pocket.

3. A cot for automobiles comprising two end frames connected by a flexible strip, one frame adapted to be permanently carried by the body of the automobile at the rear, locks carried by the other frame and adapted to be extended under the instrument board to prevent the upward movement of the frame, folding legs carried by said frame and resting on the floor board, and braces removably attached to the frame and engaging the support of the seat.

In testimony whereof, I affix my signature.

WALTER C. BRYE.